April 7, 1964  H. K. HUGHES ETAL  3,128,387
PHOTOSENSITIVE LOW-TORQUE TRANSDUCER
Filed Sept. 22, 1959  3 Sheets-Sheet 1

INVENTORS
HAROLD K. HUGHES
MYRON A. COLER
BY Lawrence J. Field
ATTORNEY

April 7, 1964

H. K. HUGHES ETAL 3,128,387

PHOTOSENSITIVE LOW-TORQUE TRANSDUCER

Filed Sept. 22, 1959

INVENTORS
HAROLD K. HUGHES
MYRON A. COLER

BY *Lawrence J Field*

ATTORNEY

April 7, 1964   H. K. HUGHES ETAL   3,128,387
PHOTOSENSITIVE LOW-TORQUE TRANSDUCER
Filed Sept. 22, 1959   3 Sheets-Sheet 3

INVENTORS
HAROLD K. HUGHES
MYRON A. COLER
BY Lawrence J. Field
ATTORNEY

United States Patent Office 3,128,387
Patented Apr. 7, 1964

3,128,387
PHOTOSENSITIVE LOW-TORQUE
TRANSDUCER
Harold K. Hughes, 98—20 62 Drive, Rego Park, N.Y.,
and Myron A. Coler, 56 Secor Road, Scarsdale, N.Y.
Filed Sept. 22, 1959, Ser. No. 841,574
3 Claims. (Cl. 250—237)

This invention relates to an improved transducer and more particularly to a low-torque or low-force device for converting a plurality of mechanical inputs into one or more electrical outputs.

In a preferred form, the device comprises an apparatus in a light-tight enclosure wherein light from one or more sources is attenuated in a definite manner and the attenuated light is then received on one or more light sensitive targets to produce one or more independent output signals each of which is a representative function of the several mechanical inputs.

A principal object of the invention is to provide an electrical output which is a function of two or more independent mechanical inputs.

Another object is to provide a plurality of independent transducers in a single housing each section of which is representative of its mechanical input according to a predetermined relation.

Still another object of this invention is to provide, in a single enclosure, a plurality of independent transducers or a single transducer whose electrical output is a predetermined function of two or more independent mechanical inputs, which shall have essentially no contact resistance, no eddy currents, no sparking and virtually no wear due to moving parts.

Another object is to provide such transducers whose only moving parts may be so mounted on primary sensing elements, such as gyroscopes, pressure gages, or compasses, that no additional force or torque is transmitted to the sensing element.

A further object is to provide such devices, from which both simple linear and complex function outputs may be readily and interchangeably obtained and which have a rapid response.

Still a further object of the invention is to provide a transducer of the types described above which may be safely shorted out and wherein there is virtually no limitation on the rate of change of function.

An additional object is to provide a transducer which is both rugged and compact and which produces one or more electrical outputs which can be utilized in many practical devices, particularly those where the mechanical motion is minute, for example 0.1 inch or less.

These and other objects are attained by the devices of the present invention described in the accompanying specification and drawings, in which.

In the devices shown in FIGURES 1-5 the mechanical-electrical transducer comprises one or more suitable sources of radiation R and diffusers D, slit-bearing plates S and masks M which cooperate to control the amount of radiation from the source or sources permitted to impinge on radiation-converting targets T. The radiation passed to the masks is preferably caused to travel through a diffuser to spread the radiation more uniformly at the mask. Discs S, each containing one or more slits, are provided on either or both sides of masks described below, the slits being provided to further delineate the beam of radiation permitted to fall on the target.

The masks are supported for movement on shafts I which are adapted to be connected to the mechanical inputs. The masks may be either entirely opaque solid discs, of a suitable configuration such that motion of the supporting shaft produces a cut-off of varying amounts of the radiation from source R, transmitted to targets T, or the masks may be partly opaque and partly transparent or translucent e.g. in the manner of a photographic film.

Each mask is preferably constructed so that the radiation transmitted to its target is a function of the motion of the supporting shaft relative to an initial original reference position.

Figure 1:
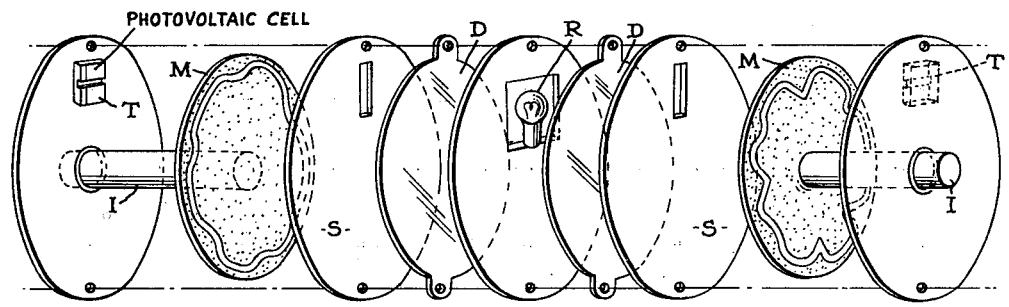
FIGURE 1 is a schematic exploded view illustrating one manner of arranging the elements in a multiple-input rotary transducer, omitting for purposes of illustration the light-tight enclosure, electrical leads and circuitry.

In the device shown in FIGURE 1 radiation from a single source R travels in opposite directions and is received on two separate targets T after travelling through two separate mask-diffuser-slit apparatuses (each consisting of a diffuser D, a fixed slit-bearing member S and a moveable mask M), into which two independent mechanical inputs are fed. As shown in FIGURE 1 each of the masks is mounted separately on its own shaft I and is supported for rotation in bearings. The two shafts are free to rotate independently of each other and hence represent the means whereby two entirely independent inputs may be fed into the device.

The two masks M and the two duplex targets illustrated in FIGURE 1 are suitable for two independent balanced push-pull outputs but it will be readily appreciated that the same or similar apparatus may be used with two single-sided output circuits. Furthermore, the targets may be single instead of duplex. In addition the outputs of the targets may be combined in the usual way to yield a single output functionally related to the two independent inputs as for example by a product, sum or similar relationship.

The electrical outputs resulting from the illumination permitted to fall on targets T may be taken off by suitable separate and independent leads or the two outputs may be combined and led to connectors, as hereinafter described.

Figure 2:
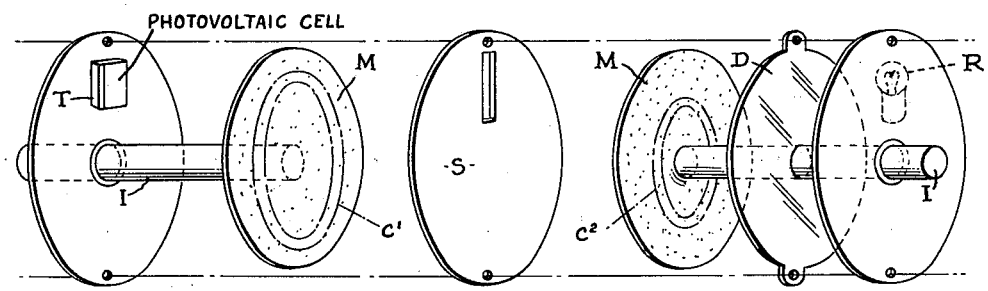
FIGURE 2 is a schematic view of another multiple-input rotary transducer.

FIGURE 2 shows another embodiment wherein the radiation travels in only one direction instead of travelling in two directions as in the previously described device in FIGURE 1. An advantage of this arrangement is that fewer components are employed thereby reducing the cost and the space requirements of the device. Light from lamp R passes in succession through diffuser D, a first mask M, slit in disc S, a second mask M and a second slit in a second disc S before it finally impinges on light-sensitive cell T. Independent motions of the two shafts I are thereby converted into one or more electrical outputs from cell T, as hereinafter described.

In one embodiment of the device shown in FIGURE 2 the path taken by the radiation from the lamp source to the light-sensitive target may be a single path with the level of radiation ultimately falling on the detector determined by both masks. Alternately, there may be two radially-displaced parallel paths, in one of which the radiation is attenuated only by the first mask M and in the other of which the radiation is attenuated only by the second mask M. The light-sensitive cell T may be either a single or duplex cell. If it is a single cell and there is but one optical path to it from the radiation source, the electrical output is the product of the two independent input functions. What these functions are is determined by the nature of the two masks, acting in cooperation with the slits. For example, the transmittance of each mask, which may be in the form of a photographic emulsion, may be a linear function of the angle of rotation of its respective shaft, in which case the electrical output will be linearly related to the product of the two angles of rotation.

Alternately, in the device of FIGURE 2 there may be two separate optical paths from the radiation source to a single or duplex target or to two separate targets. The dashed lines in FIGURE 2 show an arrangement in which each of the two masks M have clear, completely transparent regions designated as $C_1$ and $C_2$ respectively. These clear regions are of approximately the same radial width but are located at different radial distances from the center line of the shafts supporting the masks. By this means, two beams of radiation from source R travel along two paths approximately parallel to the shafts, each such beam of radiation being attenuated by only one of the masks. In this case, the electrical output will be the sum of the two separate input functions. If the two partial electrical outputs bear a logarithmic relation to their respective mechanical inputs, for example, then the combined electrical output will be the logarithm of the product of the two inputs. This is another and distinct manner of obtaining the product of two independent inputs. With two paths and a duplex cell, it is possible to have two independent outputs from the two independent inputs.

Figure 3:
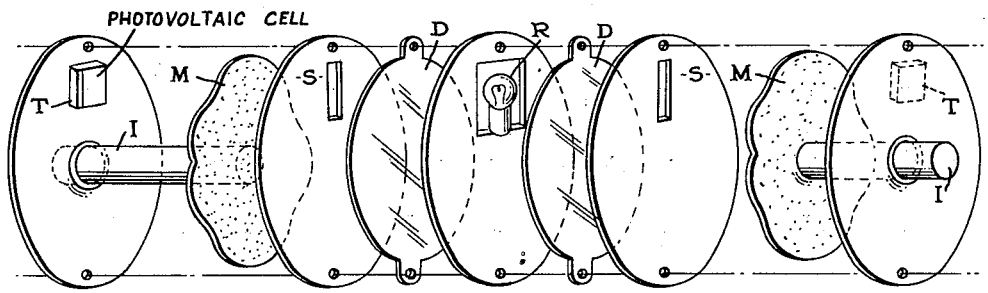
FIGURE 3 is a schematic view of still another multiple-input rotary transducer.

FIGURE 3 is a slightly modified version of the device of FIGURE 1 where in place of a duplex cell and a push-pull circuit, a single-sided output is used. Thus, in place of having a mask which simultaneously covers half of a duplex cell and uncovers the other half, there is shown an opaque edge-mask which affects the entire cell as a single unit.

Figure 6:
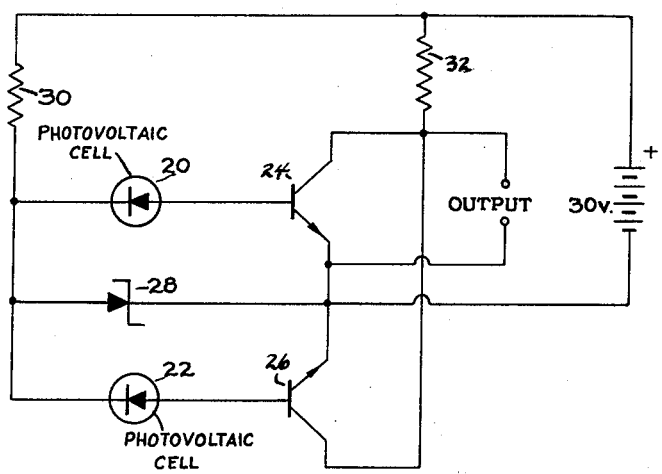
FIGURE 6 is a circuit suitable for the devices of FIGURES 1-5.

The outputs of the two cells of the device constructed according to FIGURE 3 may be led to separate amplifiers, or for an addition of inputs, they may be combined as illustrated in FIGURE 6. If the two separate functions logarithmically relate their respective inputs and partial outputs, then the combined electrical output will be the logarithm of the product of the two inputs. The electrical outputs of the two cells may also be combined in other ways such as with circuits based upon a dual-triode vacuum tube.

Figure 4:
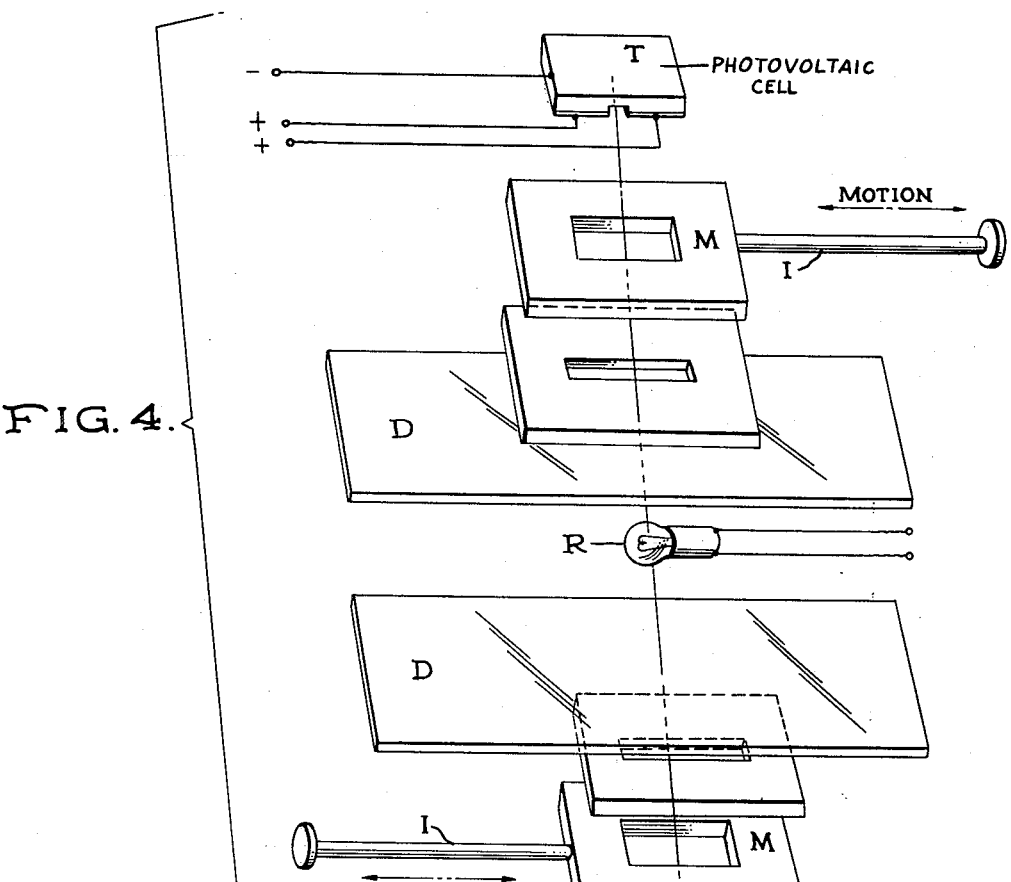
FIGURE 4 is a schematic exploded view of an alternative rectilinear arrangement.

FIGURE 4 is the corresponding rectilinear form of the invention of FIGURE 1. Light from lamp R passes through diffusers D, masks M and fixed slits S, and then impinges on photosensitive cells T. The configuration and motion of the mask produce an increase in the amount of radiation falling on one-half of its respective duplex cell while at the same time they produce a decrease in the amount of radiation falling on the other half of the duplex cell. By this means the electrical output from the cell is a push-pull representation of the mechanical input.

The functional relationship between the mechanical input and the electrical output of the transducer is determined by the shape of the mask and any cooperating fixed slits used in conjunction with the mask. For a linear relationship in the devices of FIGURES 4 and 5, the hole in the mask is a rectangle. For other relationships the mask is given other suitable shapes and proportions. As will be readily understood, a simple single-sided circuit may be employed in place of a push-pull output in which device the cells are not converted to the duplex cells described above.

Figure 5:
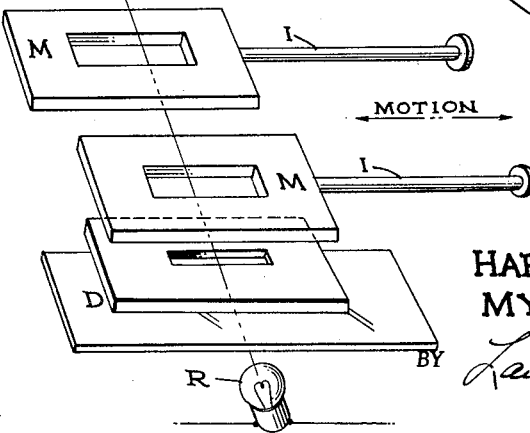
FIGURE 5 is a schematic view of another multiple-input rectilinear transducer.

FIGURE 5 shows a rectilinear embodiment of the device corresponding to the rotary form shown in FIGURE 2. The same flexibility in possible modes of operation and connections applies to the device of FIGURE 5 as applied to the device of FIGURE 2.

FIGURE 6 shows a circuit for the devices of FIGURES 1-5. As shown two photovoltaic cells 20 and 22 which correspond to the targets T in FIGURES 1-5, produce a voltage, in response to the radiation falling on them, which make the base of transistors 24 and 26 more positive. The flow of electrons through the transistor from emitter to collector is controlled by the output voltage of cells 20 and 22. Zener diode 28 and a resistor 30 in series with the diode bias the transistors into their linear region.

The output voltage is developed by load resistor 32 by means of variations in the combined flow of collector currents.

In a specific device, the targets were Hoffman silicon photovoltaic cells type 51C, the diode 28 was a Transitron No. SG 22, resistor 30 was 7500 ohms, resistor 32 was 5000 ohms and the transistors were Transitron ST 45 (npn) silicon transistors.

Figure 7:
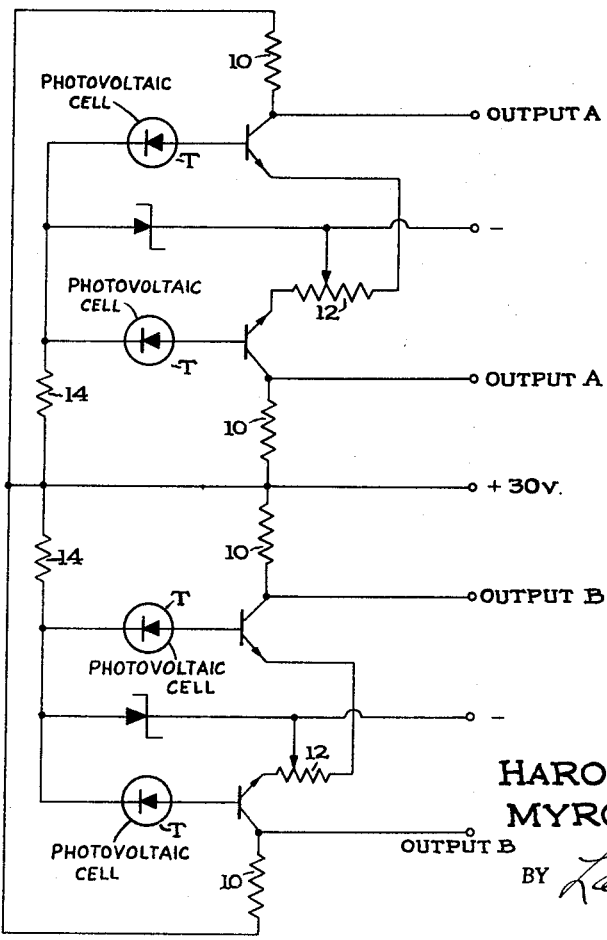
FIGURE 7 is another circuit suitable for the devices of FIGURES 1 and 4.

Turning to FIGURE 7, the circuit for obtaining two independent outputs in simplest form consists of two push-pull transistor amplifiers wherein the targets T which are preferably the duplex photovoltaic cells of FIGURE 1, feed their respective transistors and the outputs are taken from the pair of load resistors 10 in the manner shown. The duplex cells may be formed by taking a narrow cut with a thin abrasive wheel through the p-layer of Hoffman No. 51C silicon photovoltaic cells or equivalent. Other amplifiers such as those utilizing vacuum tubes in place of transistors can be employed.

In a specific device constructed with the circuit of FIGURE 7 the photovoltaic cells were duplex Hoffman silicon photovoltaic cells No. 51C; the diodes are the same as those in FIGURE 6, load resistors 10 were each 7500 ohms, resistors 14 were each 39,000 ohms, balancing potentiometers 12 were 200 ohms, and the transistors were those of FIGURE 6.

As will be evident from the foregoing discussion, the maximum in flexibility is achieved by providing a duplex cell and two optical paths since any of the above arrangements may be obtained at will by suitably operating such a device.

Other functions than those specifically mentioned may be readily obtained by proper choice of the mask-transmittance-vs-mechanical-movement relationship.

By making the mountings of the masks interchangeable and then changing masks, it will be apparent that the device provides a mode of adaptation to accommodate various input-output relationships, with a minimum of rebuilding.

Other combinations of optical paths, detectors, radiation sources, diffusers and circuits are possible within the spirit of this invention. In place of incandescent lamps, other sources which may be employed include, for example, luminescent sheets, neon lamps, radioactive sources and the like. Other detectors may likewise be employed provided only that they are matched to the character of the radiation used. For example, photoelectric and photoconductive cells, Geiger counters, etc. may be employed.

Likewise, other attenuators may be employed, such as a wedge of tinted glass or plastic, liquids in transparent or translucent containers, Ronchi rulings, etc.

While this invention has so far been described in terms of two independent shaft inputs, it should be understood that three or more independent inputs can be provided; and associated circuits, similar to those described above, can be devised by one skilled in electronics to combine three or more independent inputs into a single output; or the outputs may be brought out through separate leads.

We claim:

1. A device for producing an electrical signal output which bears a predetermined functional relationship to the positions of a plurality of independently movable shaft members in the device and which includes in combination, in a suitable housing: at least one source of radiation, at least one radiation-sensitive target converting radiation received thereon into at least one electrical signal and positioned so as to receive at least a portion of said radiation; a slit-bearing plate, fixedly positioned with reference to said source of radiation and positioned between said source and said target; and a plurality of attenuating means, movable with reference to said source of radiation and each operatively connected to one movable shaft and, in response to a change in position thereof, adapted to attenuate the radiation from said source permitted to reach the target whereby the electrical signal output of said device is the intended function of the positions of said shaft members.

2. A device for producing an electrical signal output which bears a predetermined functional relationship to the positions of a plurality of independently movable shaft members in the device and which includes in combination, in a suitable housing: at least one source of radiation; at least two radiation-sensitive targets each positioned so as to receive at least a portion of radiation from said source, each of said targets converting radiation received thereon into at least one electrical signal; and a plurality of attenuating means, each attenuating means being operatively connected to one of said movable shafts and, in response to a change in position thereof, adapted to attenuate the radiation from said source permitted to reach a target operatively associated therewith, whereby the electrical signal output of said device is the intended function of the positions of said shaft members.

3. A device for producing an electrical signal output which bears a predetermined functional relationship to the positions of a plurality of independently movable shaft members in the device and which includes in combination, in a suitable housing: at least one source of radiation, at least one radiation-sensitive target positioned so as to receive at least a portion of said radiation said target converting the radiation received thereon into at least one electrical signal and a plurality of attenuating means, each attenuating means comprising a mask, a diffuser and a slit bearing member, each mask operatively connected to one of said movable shaft members, responsive to a mechanical input and, in response to a change in position of said movable shaft, adapted to attenuate the radiation from said source permitted to reach the target, whereby the electrical signal output of said device is the intended function of the positions of said shaft members.

References Cited in the file of this patent
UNITED STATES PATENTS

| | | |
|---|---|---|
| 2,586,540 | Holden | Feb. 19, 1952 |
| 2,640,866 | Powell | June 2, 1953 |
| 2,756,930 | Pelsor et al. | July 13, 1956 |
| 2,788,519 | Caldwell | Apr. 9, 1957 |
| 2,796,598 | Cartwright | June 18, 1957 |